United States Patent
Greaves, Jr.

(10) Patent No.: US 6,280,004 B1
(45) Date of Patent: Aug. 28, 2001

(54) BRAKE CONTROL SYSTEM FOR BALANCED BRAKING OF A TOWED VEHICLE

(76) Inventor: John C. Greaves, Jr., 190 Wilson Blvd. North, Naples, FL (US) 34120-2073

( * ) Notice: Subject to any disclaimer, the term of this patent is extended or adjusted under 35 U.S.C. 154(b) by 0 days.

(21) Appl. No.: 09/314,613

(22) Filed: May 19, 1999

(51) Int. Cl.[7] .................................................. B60T 13/66
(52) U.S. Cl. ............................................. 303/20; 188/3 R
(58) Field of Search ............................... 188/3 R; 303/20

(56) References Cited

U.S. PATENT DOCUMENTS

| | | | |
|---|---|---|---|
| 2,856,036 | 10/1958 | Mullen ................................ | 188/112 |
| 3,053,348 | 9/1962 | Stair .................................... | 188/112 |
| 3,882,442 | * 5/1975 | Hubbard .............................. | 338/41 |
| 3,990,749 | 11/1976 | Mizen et al. ........................ | 303/24 |
| 4,072,362 | * 2/1978 | Van Anrooy ........................ | 303/7 |
| 4,222,614 | * 9/1980 | Spechko .............................. | 303/20 |
| 4,568,129 | * 2/1986 | Stumpe ................................ | 303/7 |
| 5,031,729 | 7/1991 | Wittkop et al. ..................... | 188/3 |
| 5,346,289 | * 9/1994 | Cords et al. ......................... | 303/7 |
| 5,465,813 | 11/1995 | LIchter ................................ | 188/3 |
| 5,503,468 | 4/1996 | Saffran ................................ | 303/7 |
| 5,911,483 | * 6/1999 | Overhulser .......................... | 303/7 |

* cited by examiner

*Primary Examiner*—Robert J. Oberleitner
*Assistant Examiner*—Benjamin A Pezzlo
(74) *Attorney, Agent, or Firm*—Eric Karich

(57) ABSTRACT

A brake control system has a power source electronically connectable through a brake switch and a microswitch to a towed brake actuation mechanism that actuates a towed brake of the towed vehicle. The brake control system is designed for use in a towed vehicle that is removably connected to a towing vehicle with a tow hitch. It is critical that the brake control system include two switches to control the actuation of the towed brake: (1) the brake switch to ensure that the towed brake is not actuated until the user depresses a brake pedal to actuate the towing brake of the towing vehicle; and (2) the microswitch to ensure that the towed brake is not actuated unless the towed vehicle and the towing vehicle are being pressed together, such as when the towing vehicle is braking and the towed vehicle is coasting into the towing vehicle. The microswitch is mounted on a towed-vehicle fixed point of the towed vehicle or the tow hitch; and a sensor arm extending from a housing of the microswitch to contact a towing-vehicle fixed point of the towing vehicle or the tow hitch.

1 Claim, 2 Drawing Sheets

BRAKE CONTROL SYSTEM FOR BALANCED BRAKING OF A TOWED VEHICLE

BACKGROUND OF THE INVENTION

1. Field of the Invention

This invention relates generally to vehicle braking devices, and more particularly to a vehicle braking device that operates to actuate and balance the braking of a towed vehicle.

2. Description of Related Art

Various brake control devices have been devised in the prior art for providing a towed vehicle with an independent braking system. The following prior art patents are illustrative the brake control devices that have been developed by the industry in the past.

Mullen, U.S. Pat. No. 2,856,036, discloses an automatic electric trailer brake control system that uses a hitch sensing device to automatically control electronic brakes. Whenever the trailer pushes against the towing vehicle, a microswitch triggers the electronic brakes in the trailer. An automatic rheostat functions to increase or decrease the strength of the braking, depending upon the length of time that the microswitch is closed. This type of control system sounds good in theory, but it does not work well in practice. Irregularities in the roadway and the natural swaying of both the towing vehicle and the trailer cause jolting of the hitch ball and unwanted and repeated activation of the trailer brakes. Not only does this create an uruiatural drag on the towing vehicle, this abuse also causes the trailer brakes to burn out. Furthermore, to minimize the impact of this problem, users of this system must set the brakes at a very low setting, causing the trailer brakes to be ineffective in emergency braking situations.

Since the pressures on the trailer hitch proved to be too unreliable to govern the brakes of a trailer or other towed vehicle, the art moved away from this solution and embraced instead various devices that sensed the change in momentum of the vehicle. These devices operate under the assumption that a change in momentum signifies rapid braking, and triggers the trailer brakes to help stop the vehicles. A first example of this approach, Stair, U.S. Pat. No. 3,053,348, discloses an electronically operated brake for a trailer that is actuated when the user engages the brakes of the towing vehicle. A pendulum pivots in response to either a change in momentum, such as a deceleration, or in response to the grade of the road, such as driving down a steep hill, and modifies the amount of braking force applied. A second example of this approach, Mizen et al., U.S. Pat. No. 3,990,749, discloses an inertia actuated servomotor for a trailer. The servomotor regulates a trailer's brakes in response to the movement of a weighted lever arm. The weighted lever arm is operably connected to the servomotor that controls the flow of vacuum from that towing vehicle, thereby actuating the brakes of the trailer.

This approach also failed under real-life driving conditions. The same imperfections in the road and irregularities in the trailer's momentum led to braking at undesirable times, which in turn made it difficult to calibrate braking strengths. The Stair device would trigger braking at merely a response to the grade of the road. The Mizen device would activate the brakes of the trailer when the user attempted to drive in reverse. While both devices functioned well during some driving conditions, neither device was able to function well during all driving conditions.

It is important to provide some braking of the towed vehicle to relieve the strain on the towing vehicle. It is especially desirable to provide strong braking in emergency-stop situations. However, it is undesirable to have the towed brake act as an "anchor" that helps pull the towing vehicle to a stop; and it is unacceptable for the brake control device to activate the towed brake when braking is not desired.

The prior art teaches various brake control devices that actuate the brakes of a towed vehicle in response to the actuation of the brakes of the towing vehicle. It is also known that it is desirable to modify this braking force in response to outside factors such as the rate of change of the momentum of the towed vehicle, and the grade of the road. However, the prior art does not teach a brake control device that only triggers the brakes of the towed vehicle when the brakes of the towing vehicle are actuated, and when the towed vehicle presses forward against the towing vehicle that is attempting to stop. The present invention fulfills these needs and provides further related advantages as described in the following summary.

SUMMARY OF THE INVENTION

The present invention teaches certain benefits in construction and use which give rise to the objectives described below.

The present invention provides a brake control system for balanced actuation of a towed brake of a towed vehicle. The brake control system is designed for use when the towed vehicle is removably connected to a towing vehicle with a means for connecting the towed vehicle to the towing vehicle. The brake control system operably controls a means for actuating a towed brake. It is critical that the brake control system include two switches to control the actuation of the towed brake: (1) a brake switch that is closed when the user depresses a brake pedal to actuate the towing brake of the towing vehicle; and (2) a microswitch positioned in proximity to the connection means, the microswitch being closed when the towed vehicle exerts a forward pressure against the towing vehicle, typically when the decelerating towing vehicle presses back against the coasting towed vehicle.

A primary objective of the present invention is to provide a brake control device having advantages not taught by the prior art.

Another objective is to provide a brake control device having a microswitch that senses the "slop" or "play" inherent in any tow hitch and modifies the braking action initiated by the brake control device in response to movement within the tow hitch.

Another objective is to provide a brake control device that only triggers the brakes of the towed vehicle when the brakes of the towing vehicle are actuated and when the towed vehicle presses forward against the towing vehicle that is attempting to stop.

A further objective is to provide a brake control device that is entirely self-regulating, strongly triggering the brakes of the towed vehicle when the towing vehicle brakes hard, but relieving the braking pressure once the towed vehicle no longer presses forward against the towing vehicle.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
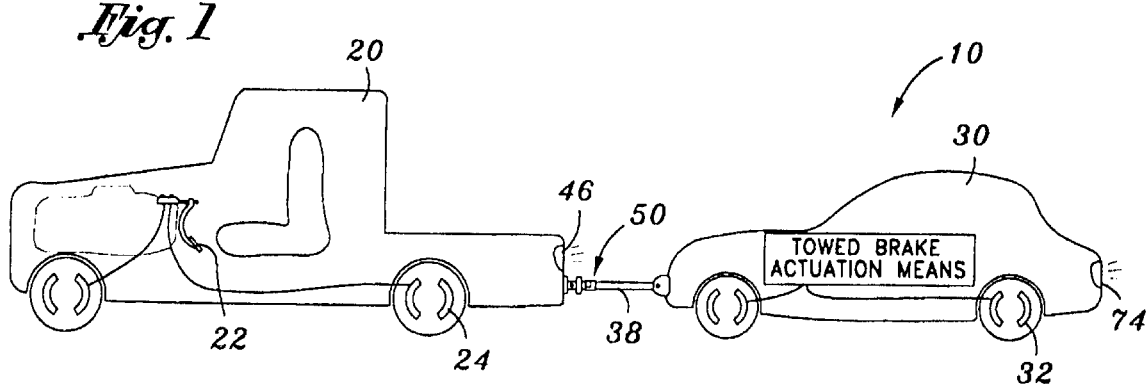
FIG. 1 is a side elevational view of a towing vehicle connected to a towed vehicle with a tow hitch.

The above described drawing figures illustrate the invention, a brake control system 10 for balanced actuation of a towed brake 32 of a towed vehicle 30. As shown in FIG. 1, the brake control system 10 is designed for use when the towed vehicle 30 is removably connected to a towing vehicle 20 with a means for connecting 38 the towed vehicle 30 to the towing vehicle 20. The brake control system 10 operably controls a means for actuating 72 a towed brake 32 for braking the towed vehicle 30 in response to the signal from the brake control system 10. In its preferred embodiment the connecting means 38 is a tow hitch, although the brake control system 10 can be installed and adapted for use with any form of hitch, tow bar, trailer connection, fifth wheel connection, or other form of towing connection known in the art.

It is critical that the brake control system 10 include two switches to control the actuation of the towed brake 32: (1) a brake switch 44 that is closed when the user depresses a brake pedal 22 to actuate the towing brake 24 of the towing vehicle 20; and (2) a microswitch 50 positioned in proximity to the tow hitch 38 such that the microswitch 50 is closed when the towed vehicle 30 exerts a forward pressure against the towing vehicle 20. The forward pressure of the towed vehicle 30 serves to close the microswitch 50, as described more fully below. While the prior art contains systems using one of these criterion, the prior art does not show a system that incorporates both criteria. By activating the towed brake 32 only when both the brake switch 44 and the microswitch 50 are closed, this brake control system 10 is successful in balancing the braking of the towed vehicle 30 with respect to the towing vehicle 20, avoiding undesirable braking of the towed vehicle 30 and makes the towed brake 32 self-regulating. This, in turn, makes it possible to greatly increase the strength of the braking action of the towed brake 32, providing better braking during emergency stops. This unique relationship represents a dramatic improvement over the prior art.

Figure 3:
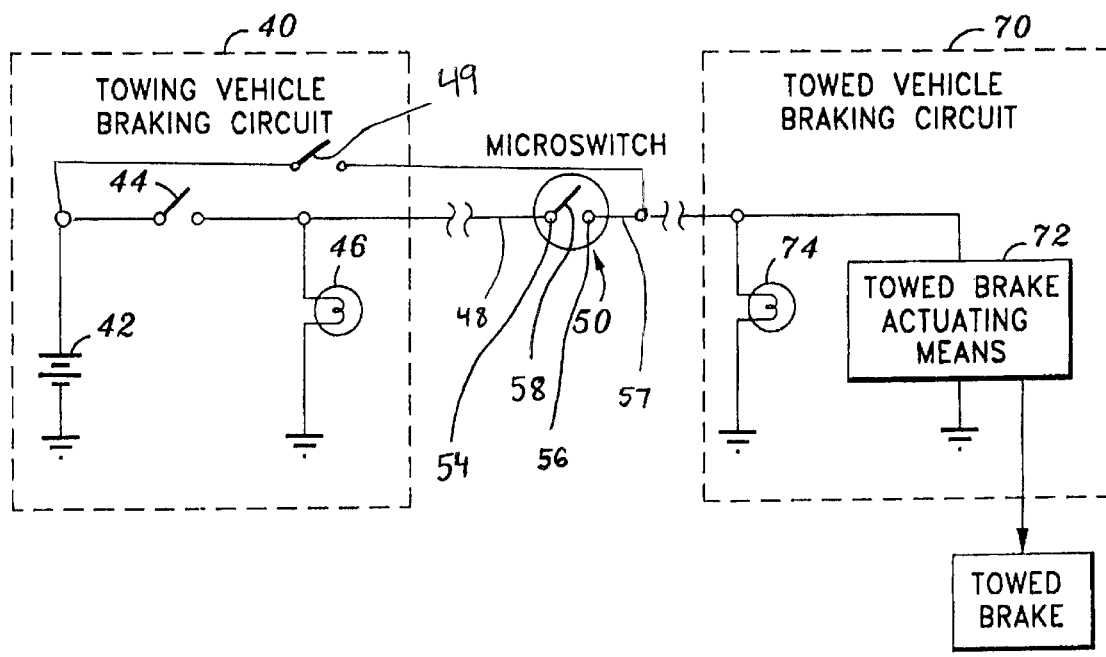
FIG. 3 is a schematic of the preferred embodiment of the invention.

As shown in FIG. 3, the brake control system 10 includes a towing vehicle braking circuit 40 electronically connected to a towed vehicle braking circuit 70 through the microswitch 50. The towing vehicle braking circuit 40 includes a power source 42 electronically connected to a brake switch 44 that is operably controlled by the towing brake 24 of the towing vehicle 20. When the towing brake 24 is actuated, typically in response to the driver depressing the brake pedal 22 of the towing vehicle 20, the brake switch 44 is closed to electronically connect the power source 42 to a towing vehicle brake light 46 and any additional elements that require electricity during the braking of the towing vehicle 20. The brake switch 44 of the towing vehicle braking circuit 40 is also electronically connected to a power input terminal 54 of the microswitch 50, preferably with an input electrically conductive cable 48 having a metallic insulating jacket for protection from heat, the elements, and damage from flying debris. The towing vehicle braking circuit 40 may include a brake controller (not shown) as is commonly used in towed braking systems to calibrate the system for a particular towed vehicle and to manually adjust the strength of the braking, typically with a rheostat. Such a brake controller is described in Mullen, U.S. Pat. No. 2,856,036, hereby incorporated by reference. Although this invention eliminates the requirement of a brake controller by balancing the braking with the microswitch 50, a brake controller may still be incorporated into the towing vehicle braking circuit 40 to provide the user with an additional level of control and customization. The towing vehicle braking circuit 40 preferably further includes a manual override switch 49 that electronically connects the power source 42 directly to the towed vehicle braking circuit 70, preferably at an output electronically conductive cable 57 described below. By bypassing the brake switch 44 and the microswitch 50 (and the brake controller, if used), user is able to manually apply full power to the towed brake 32 in the case of an emergency.

The towed vehicle braking circuit 70 of the brake control system 10 includes a towed brake actuating means 72, a towed vehicle brake light 74, as well as any other electronic device that are designed to be activated when the towed brake 32 of the towed vehicle 30 is actuated. The towed brake actuating means 72 can be any of the many towed braking systems known in the art, including electronically actuated air, pneumatic, fluid and mechanical piston cylinders, as well as electronic brakes that directly actuate the towed brake 32. Many acceptable devices known in the art and can be readily adapted to this new brake control system 10. Some examples of functional towed brake actuating means 72 are disclosed in the following patents, hereby incorporated by reference: Lichter, U.S. Pat. No. 5,465,813, Wittkop et al., U.S. Pat. No. 5,031,729, and Saffran, U.S. Pat. No. 5,503,468.

Figure 1A:
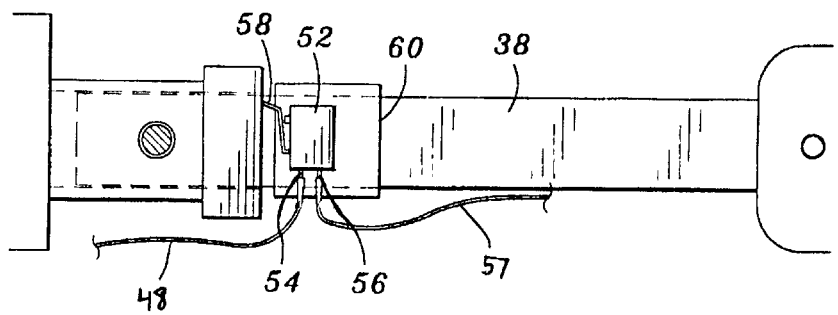
FIG. 1A is a side elevational view of the tow hitch, showing a preferred embodiment of a microswitch operably mounted thereupon.
Figure 2:
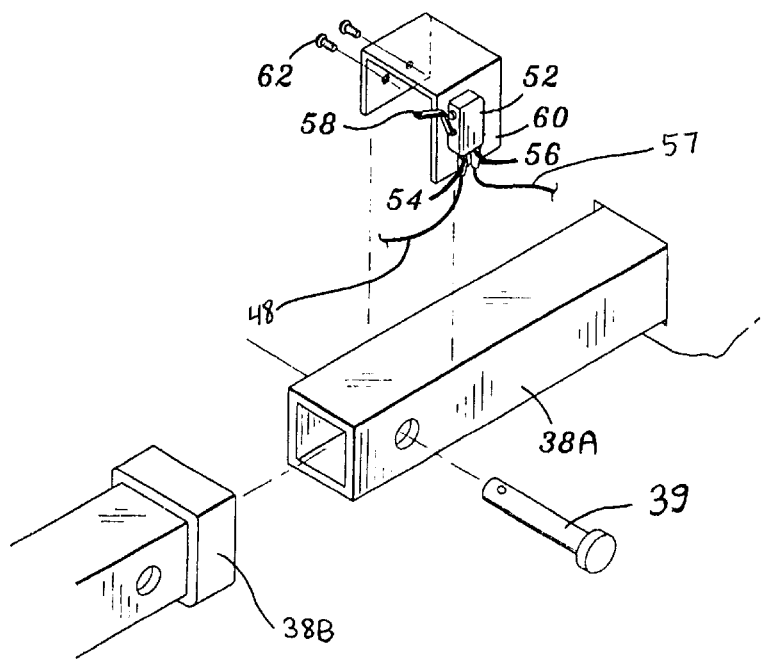
FIG. 2 is an exploded perspective view thereof.

As shown in FIG. 3, the towing vehicle braking circuit 40 is electronically connectable to the towed vehicle braking circuit 70 with the microswitch 50 installed on the tow hitch 38 between the towing vehicle 20 and the towed vehicle 30. In its preferred embodiment, as shown in FIGS. 1A and 2, the microswitch 50 includes a housing 52 that contains a power input terminal 54 and a power output terminal 56. A sensor arm 58 extends from the housing 52 and is manually closable in response to the movement of the towed vehicle 30 relative to the towing vehicle 20, as described more fully below, to form an electronic circuit connecting the power input terminal 54 to the power output terminal 56. The sensor arm 58 thereby functions to close the microswitch 50 when the towing vehicle 20 and the towed vehicle 30 are being pressed together, such as when the towing vehicle 20 is braking and decelerating relative to the towed vehicle 30. As shown in FIG. 2, the sensor arm 58 is preferably a trip lever that is hingably attached to the housing 52 and extends to contact a towing-side fixed point 38B, described more fully below. While the trip lever 58 is shown as the preferred embodiment, various other mechanisms are equivalent, including a sensing button, a push rod, or other embodiment, such as disclosed in Mullen, U.S. Pat. No. 2,856,036, hereby incorporated by reference.

The microswitch 50 further includes a means for mounting 60 the housing 52 of the microswitch 50 to detect the "slop" or "play" within the connection means 38, as described below. The specific structure of this aspect of this invention will vary depending upon the specific connection means 38 involved and the sensor arm 58 selected; however, three elements will always remain constant: a towing-side fixed point 38B, a towed-side fixed point 38A, and the microswitch 50, described above, that can detect the movement in the connection means 38. The towing-side fixed point 38B is some portion of the towing vehicle 20 or its associated portion of the connection means 38 that is rigidly fixed to and moves with the towing vehicle 20. The towed-side fixed point 38A is some portion of the towed vehicle 30 or its associated portion of the connection means 38 that is rigidly fixed to and moves with the towed vehicle 30. In its preferred embodiment, as shown in FIG. 2, the means for mounting 60 is preferably a mounting bracket shaped to engage the towed-side fixed point 38A of the tow hitch 38. When the connection means 38 is a tow hitch, as described above, the towing-side fixed point 38 preferably slidably engages the towing-side fixed point 38B and is removably locked in place with a locking pin 39. The mounting bracket 60 is locked in place with a pair of bolts 62 such that the sensor arm 58, preferably a trip lever, is positioned adjacent to the towing-side fixed point 38B. When the towing vehicle 20 presses back against the towed vehicle 30 in the process of braking, the towing-side fixed point 38B moves slightly towards the towed-side fixed point 38A because the locking pin 39 does not perfectly joint the two elements (thereby leaving what is commonly referred to as "slop" or "play" in the connection). When the towing-side fixed point 38B moves towards the towed-side fixed point 38A, it manually depresses the trip lever 58, causing the trip lever 58 to manually close and form an electronic circuit connecting the power input terminal 54 to the power output terminal 56. Although for clarity we state that the mounting means 60 is attached to the towed-side fixed point 38A and the sensor arm 58 contacts the towing-side fixed point 38B, this is clearly equivalent to the inverse situation in which the mounting means is attached to the towing-side fixed point 38B and the sensor arm 58 contacts the towed-side fixed point 38A, and the claims should be so construed.

The power output terminal 56 is electronically attached to the towed vehicle braking circuit 70, preferably with an output electrically conductive cable 57 having a metallic insulating jacket, as described above. As described above, the brake control system 10 thereby actuates the towed brake 32 when the brake switch 44 of the towing vehicle 20 as activated and the towed vehicle 30 is simultaneously pressing forward against the towing vehicle 20.

In use, when the driver of the towing vehicle 20 is not pressing on the brake pedal 22 he does not typically want the towed brake 32 to be braking. By including the brake switch 44, the brake control system 10 prevents braking when the user is not pressing on the brake pedal 22. Unlike many of the prior art devices, the towed brake 32 of the present invention will never be actuated until the user presses on the brake pedal 22, regardless of the grade of the road, the bumps and jolts encountered, or even if the towing vehicle 20 is driven in reverse. This protection prevents unwanted braking and burnout of the towed brake 32.

When the driver of the towing vehicle 20 presses on the brake pedal 22 and actuates the towing brake 24, he also closes the brake switch 44 and completes the towing vehicle braking circuit 40 and lights the towing vehicle brake light 46. If the strength of the actuation of the towing brake 24 is very light, or the towing vehicle 20 is going up a steep grade, the towed vehicle 30 might not press forward against the towing vehicle 20, in which case the towed brake 32 is still not activated. This prevents the towed vehicle 30 from acting as an "anchor" to stop the towing vehicle 20.

On the other hand, if the towing brake 24 is applied with strength, the towed vehicle 30 coasts into the towing vehicle 20. This causes the towing-vehicle fixed point 38B to depress the sensor arm 58 and complete an electronic circuit to electronically connect the power input terminal 54 to the power output terminal 56 and close the microswitch 50. Once the microswitch 50 is closed, the towed brake actuating means 72 is electronically connected to the power source 42 through the microswitch 50 and the brake switch 44, thereby actuating the towed brake 32 until the towed vehicle 30 has decelerated enough to pull the towing-vehicle fixed point 38B away from the sensor arm 58, open the microswitch 50, and deactivate the towed brake actuating means 72.

One of the great benefits of this particular brake control system 10 is that the towed brake 32 can be calibrated to stop the towed vehicle 30 with strength. Even if the towed brake 32 applies with too much force, the brake control system 10 adjusts itself to accommodate the situation. As soon as the towed brake 32 slows the towed vehicle 30 enough to cause the towed vehicle 30 to pull back from the towing vehicle 20, the microswitch 50 opens and the action of the towed brake 32 is halted regardless of the continued braking of the towing vehicle 20. Without the brake control system 10 of this invention, a powerful application of towed brakes at an incorrect time may cause the towed brake 32 becoming an "anchor" that could actually rip the towed vehicle 30 from the towing vehicle 20. To avoid this danger, and to avoid damage to their brakes, users typically are forced to use a brake controller set at very low settings to be sure to prevent over-braking. This invention allows the towed brakes 32 to be used to their full effect, a benefit that can be invaluable in an emergency braking situation.

In practice, the brake control device 10 will usually electronically turn on and off repeatedly during the course of a stop to precisely tailor the strength of the braking action to the needs of that particular stop. This sporadic flow of electricity mimics many complicated electronics technologies that are currently under development by manufacturers of towed braking products at this time; however, the present brake control device 10 actually achieves the desired braking characteristics that are being attempted with electronic control mechanisms. Furthermore, the current technology can be applied to ordinary pneumatic brakes, allowing a much smoother braking action than can be achieved by electronic brakes.

Another of the great benefits of this brake control system 10 is that the towed brake 32 automatically releases itself when the towing vehicle 20 moves forward with its towing brake 24 partially on. Many drivers tend to hold the towing brake 24 partially on when inching forward at a stop light. In many prior art braking systems, this would cause the towed brake 32 to remain on and become an "anchor" as described above. The present invention functions to release the towed brake 32 as soon as the towing vehicle 20 moves forward a few inches.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A microswitch for controlling the braking of a towed vehicle with respect to a towing vehicle, the towed vehicle having a towed-side fixed point and a means for actuating a towed brake, the towed-side fixed point being rigidly fixed with respect to the towed vehicle, the towing vehicle having a power source and a towing-side fixed point, the towing-side fixed point being rigidly fixed with respect to the towing vehicle, the towing-side fixed point being connectable to the towed-side fixed point to interconnect the towing and towed vehicles, the microswitch comprising:

a housing having a power input terminal and a power output terminal, the power input terminal being adapted to be electronically connectable to the power source, and the power output terminal being adapted to be electronically connectable to the means for actuating the towed brake;

a means for mounting the housing on the towed side fixed point adjacent the towing-side fixed point;

a sensor arm extending outwardly from the housing to contact the towing side fixed point such that the towing-side fixed point functions to depress the sensor arm when the housing is mounted on the towed-side fixed point and the towing vehicle decelerates with respect to the towed vehicle; and, the sensor arm being shaped to electrically connect the power input terminal and the power output terminal when the sensor arm is depressed.

* * * * *